US008556321B2

(12) United States Patent
Johnson et al.

(10) Patent No.: US 8,556,321 B2
(45) Date of Patent: Oct. 15, 2013

(54) REFRIGERATED TRAILER DOOR HAVING AN AUTOMOTIVE-STYLE HANDLE AND LOCKING MECHANISM

(75) Inventors: Peter J. Johnson, Bloomer, WI (US); John A. Marino, Rice Lake, WI (US)

(73) Assignee: Johnson Truck Bodies, LLC, Chicago, IL (US)

( * ) Notice: Subject to any disclaimer, the term of this patent is extended or adjusted under 35 U.S.C. 154(b) by 8 days.

(21) Appl. No.: 13/397,524

(22) Filed: Feb. 15, 2012

(65) Prior Publication Data

US 2012/0210743 A1 Aug. 23, 2012

Related U.S. Application Data

(60) Provisional application No. 61/443,948, filed on Feb. 17, 2011.

(51) Int. Cl.
*B60N 3/00* (2006.01)

(52) U.S. Cl.
USPC ........................................................ 296/24.41

(58) Field of Classification Search
USPC ............... 296/24.41, 100.03, 100.06, 100.07, 296/156; 312/116; 105/377.05, 377.11; 49/501, 504, 478.1; 70/208; 292/218; 62/441, 239, 344; 52/309.9, 58
See application file for complete search history.

(56) References Cited

U.S. PATENT DOCUMENTS

| | | | | |
|---|---|---|---|---|
| 2,894,378 | A * | 7/1959 | Saunders et al. | 62/337 |
| 3,153,553 | A * | 10/1964 | Sandor | 292/336.3 |
| 4,223,482 | A * | 9/1980 | Barroero et al. | 49/386 |
| 4,303,286 | A * | 12/1981 | McClellan | 312/409 |
| 5,983,682 | A * | 11/1999 | Parikh | 70/208 |
| 6,192,703 | B1 * | 2/2001 | Salyer et al. | 62/457.7 |
| 6,244,458 | B1 * | 6/2001 | Frysinger et al. | 220/592.09 |
| 6,308,518 | B1 * | 10/2001 | Hunter | 62/3.3 |
| 6,378,767 | B1 * | 4/2002 | Steele | 232/19 |
| 7,111,880 | B2 * | 9/2006 | Saitoh | 292/336.3 |
| 7,134,552 | B1 * | 11/2006 | McDonagh et al. | 206/545 |
| 7,263,855 | B2 * | 9/2007 | Meyer et al. | 62/371 |
| 7,603,875 | B2 * | 10/2009 | Carr | 62/457.7 |
| 2001/0011832 | A1 * | 8/2001 | Ehrlich et al. | 296/181 |
| 2003/0094025 | A1 * | 5/2003 | Dallman | 70/278.1 |
| 2005/0247086 | A1 * | 11/2005 | Nixon, Jr. | 70/211 |
| 2007/0186786 | A1 * | 8/2007 | Chitwood et al. | 99/401 |
| 2007/0193297 | A1 * | 8/2007 | Wilson | 62/371 |
| 2007/0289976 | A1 * | 12/2007 | Meyer et al. | 220/592.09 |
| 2009/0126854 | A1 * | 5/2009 | Khan | 156/78 |
| 2010/0119323 | A1 * | 5/2010 | Nelson | 410/135 |
| 2011/0094255 | A1 * | 4/2011 | Jeffery et al. | 62/344 |
| 2012/0227323 | A1 * | 9/2012 | Guarino et al. | 49/70 |
| 2012/0324936 | A1 * | 12/2012 | Cur et al. | 62/318 |

* cited by examiner

*Primary Examiner* — Kiran B Patel

(74) *Attorney, Agent, or Firm* — Nelson Mullins Riley & Scarborough, LLP

(57) ABSTRACT

A door for a refrigerated trailer including a door pan formed of fiberglass reinforced plastic, the door pan having an inner surface and an outer surface. A door sheet is formed of fiberglass reinforced plastic and has an inner surface and an outer surface. A foamed plastic core is provided between the inner surfaces of the door pan and the door sheet. A housing is mounted between the inner surfaces of the door pan and the door sheet and is substantially encapsulated within the foamed plastic core. An automotive-style handle and locking mechanism is mounted to the housing.

6 Claims, 6 Drawing Sheets

REFRIGERATED TRAILER DOOR HAVING AN AUTOMOTIVE-STYLE HANDLE AND LOCKING MECHANISM

CLAIM OF PRIORITY

This application claims priority to U.S. Provisional Patent Application No. 61/443,948, filed Feb. 17, 2011, the entire disclosure of which is incorporated by reference herein.

FIELD OF THE INVENTION

The present invention relates to a door having an automotive-style handle and locking mechanism for a refrigerated trailer.

BACKGROUND OF THE INVENTION

A prior art refrigerated trailer includes a body formed from a pair of rectangular sidewalls, at least one door provided in a sidewall, a front wall, a rear frame, at least one door supported in the rear frame, a roof or top panel, and a floor structure. The doors are hingedly mounted by hinges. The body defines an interior cargo compartment for carrying cargo. A refrigeration unit is mounted in the front wall and provides conditioned air to the interior cargo compartment. The floor structure may be supported by conventional axles and wheels, or may be supported by a rear undercarriage assembly and a landing gear. The trailer can be connected to a tractor having a cab by conventional means, such as a fifth wheel assembly. Each of the sidewalls, front wall and roof includes a foamed plastic core between first and second skins formed from fiberglass reinforced plastic (FRP) (this structure is commonly known in the industry as a composite plate).

Conventional door lock mechanisms include an elongated, cylindrical lockrod which extends along the height of the respective door. A generally U-shaped bearing plate is provided proximate each end of the lockrod and the bearing plates are secured to the respective door by fasteners, such as rivets. The lockrod rotates within the bearing plates, and a handle is provided for manipulating the position of the lockrod. The handle is provided partway up the lockrod on the respective door. A cam which is integrally formed at each end of the lockrod is configured to engage corresponding keeper on the body, thereby locking the doors into a closed position. Each keeper is attached to the body by suitable means, such as a weldment. Brackets are typically provided on the doors for engaging and securing the handles. Typically, the brackets are configured such that padlocks can be engaged with the brackets, thereby locking the handles in place on the doors (and thereby locking the doors in the closed position).

Because the handles are provided partway up the doors and extend outwardly from the doors, when the doors are swung to the open position, the handles may bear against the body, possibly causing damage. In addition, the handles are large and heavy, which makes the handles difficult for an operator to use.

The present disclosure provides a locking mechanism which addresses various disadvantages presented by the prior art. Other features and advantages will become apparent upon a reading of the attached specification, in combination with a study of the drawings.

SUMMARY OF THE INVENTION

The present invention recognizes and addresses considerations of prior art constructions and methods. One embodiment of a door for a refrigerated trailer includes a door pan formed of fiberglass reinforced plastic, the door pan having an inner surface and an outer surface. A door sheet is formed of fiberglass reinforced plastic and has an inner surface and an outer surface. A foamed plastic core is provided between the inner surfaces of the door pan and the door sheet. A housing is mounted between the inner surfaces of the door pan and the door sheet and is substantially encapsulated within the foamed plastic core. An automotive-style handle and locking mechanism is mounted to the housing.

In another embodiment, a refrigerated trailer includes a body defining an interior cargo compartment, a refrigeration unit mounted on the body for providing conditioned air to the interior cargo compartment, and at least one door hingedly mounted to the body. The at least one door includes a door pan formed of fiberglass reinforced plastic, the door pan having an inner surface and an outer surface, a door sheet formed of fiberglass reinforced plastic having an inner surface and an outer surface, a foamed plastic core provided between the inner surfaces of the door pan and the door sheet, a housing mounted between the inner surfaces of the door pan and the door sheet and substantially encapsulated within the foamed plastic core, and an automotive-style handle and locking mechanism mounted to the housing.

In another embodiment, a method of forming a door for a refrigerated trailer includes providing a door pan formed of fiberglass reinforced plastic, providing a door sheet formed of fiberglass reinforced plastic, attaching the door pan to the door sheet such that a space is formed therebetween, cutting an access aperture into the door pan such that the space can be accessed, inserting a housing through the access aperture in the door pan and securing the housing to the door sheet, mounting a wire through the door pan and the housing, injecting foam into the space, thereby substantially encapsulating the housing within the foam, cutting aligned holes through the door pan and the housing, cutting an access aperture through the door sheet, inserting an automotive-style handle and locking mechanism through the access aperture in the door sheet, mounting the automotive-style handle and locking mechanism to the housing and the wire and at least through the aligned holes, inserting a foam plug through the access opening in the door pan, and attaching a panel over the access opening in the door pan.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
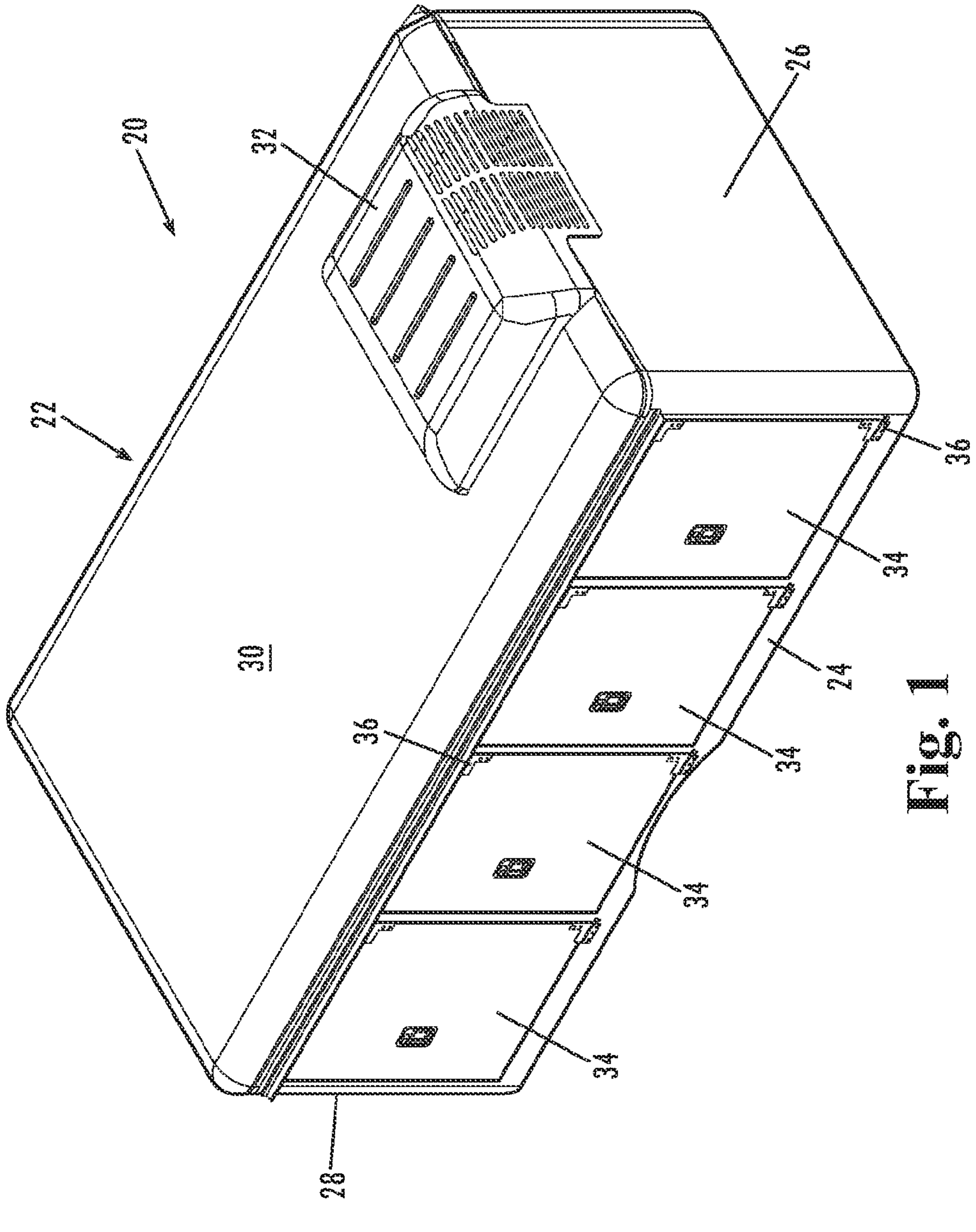
FIG. 1 is a perspective view of a refrigerated trailer which incorporates the features of the invention.

Repeat use of reference characters in the present specification and drawings is intended to represent same or analogous features or elements of the invention according to the disclosure.

DETAILED DESCRIPTION OF THE ILLUSTRATED EMBODIMENTS

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein. Therefore, unless otherwise noted, features disclosed herein may be combined together to form additional combinations that were not otherwise shown for purposes of brevity.

Figure 7:
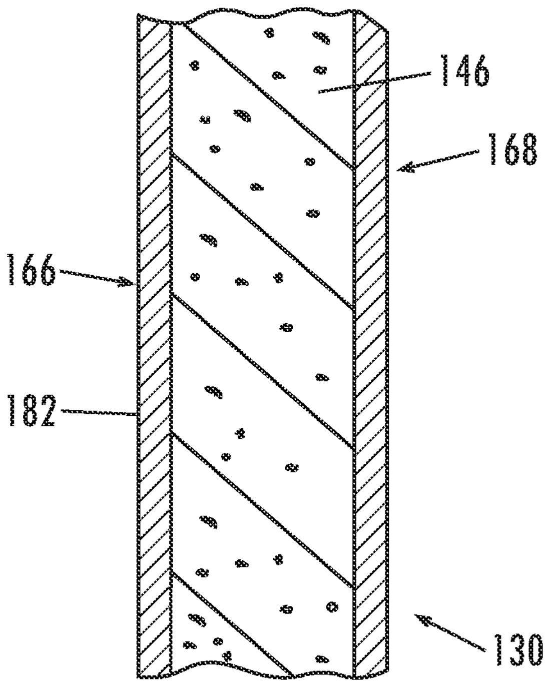
FIG. 7 is a cross-sectional view of the door along line 7-7 of FIG. 3.

A refrigerated trailer 20 includes a body 22 generally formed from a pair of rectangular sidewalls 24, a front wall 26, a rear frame 28, a wall or door (not shown) supported in the rear frame 28, a roof or top panel 30, and a floor structure (not shown). The body 22 defines an interior cargo compartment for holding and transporting cargo. A refrigeration unit 32 is mounted in the front wall 26 and provided conditioned air to the interior cargo compartment. The floor structure may be supported by conventional axles and wheels or may be supported by a conventional rear undercarriage assembly and landing gear. The trailer 20 can be connected to a cab by suitable means, or to a tractor having a cab (not shown) by conventional means, such as a fifth wheel assembly. Each of the sidewalls 24, front wall 26, roof 32 and rear wall/doors includes a foamed plastic core between first and second skins formed from fiberglass reinforced plastic (FRP) (this structure is commonly known in the industry as a composite plate) as shown in FIG. 7.

Figure 2:
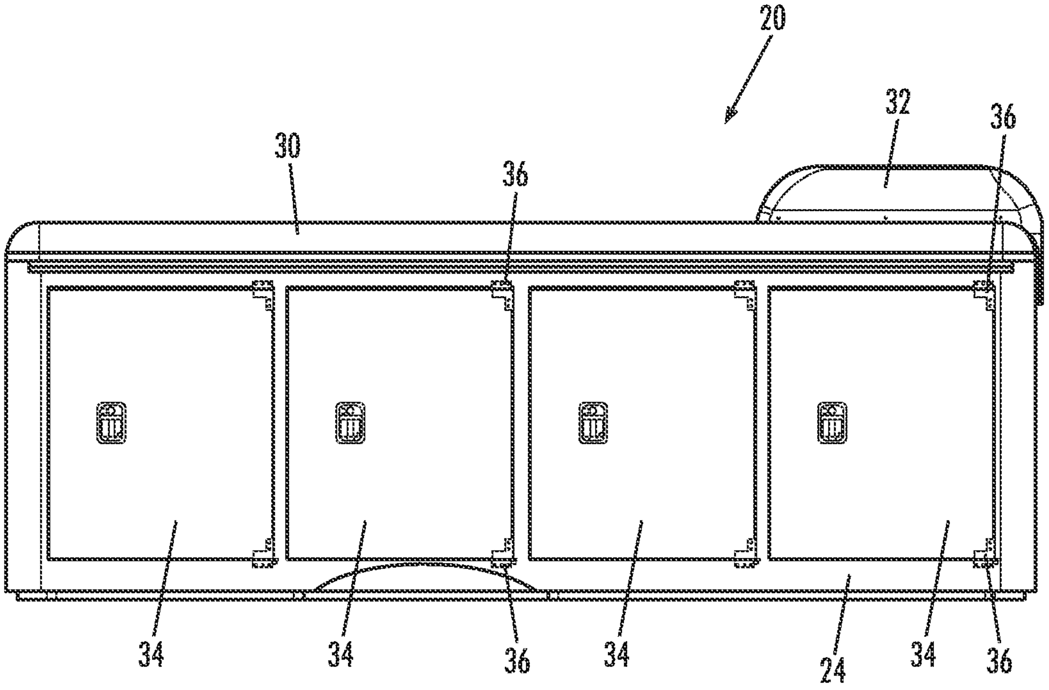
FIG. 2 is a left (or curbside) side elevational view of the refrigerated trailer.
Figure 3:
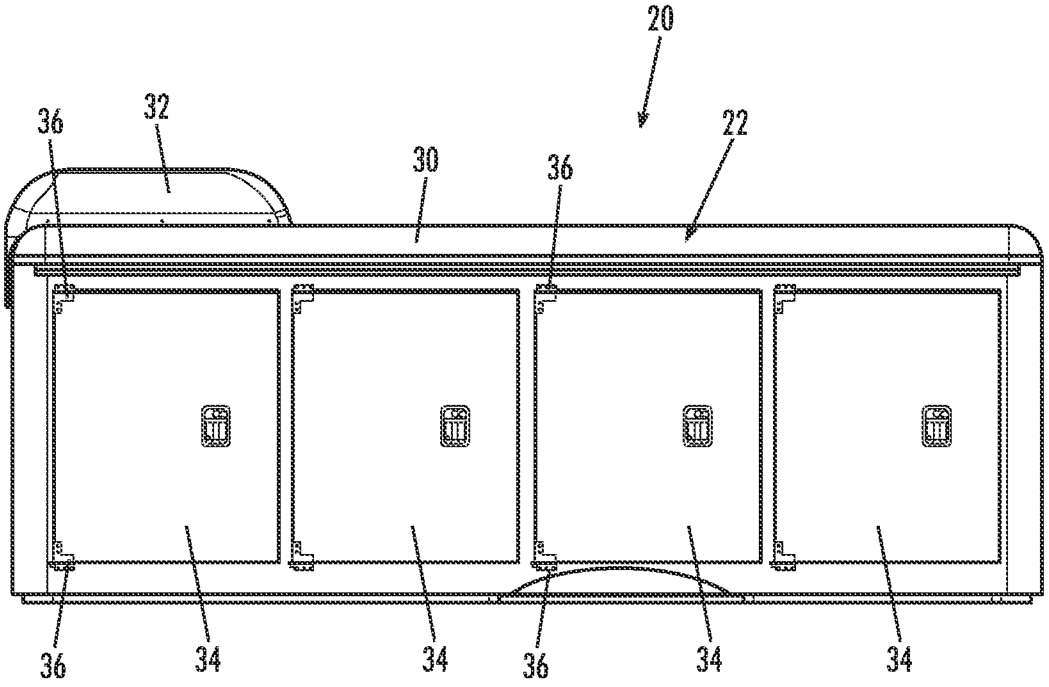
FIG. 3 is a right (or street side) elevational view of the refrigerated trailer.

A plurality of doors 34 are provided in the sidewalls 24 as shown in FIGS. 2 and 3. As discussed, a door(s) (not shown) can also be provided in the rear of the body 22. Each door 34 (including the rear door(s)) is hingedly mounted to the body 22 by hinges 36 provided at the top and bottom corners of one side of each door 34.

Figure 4:
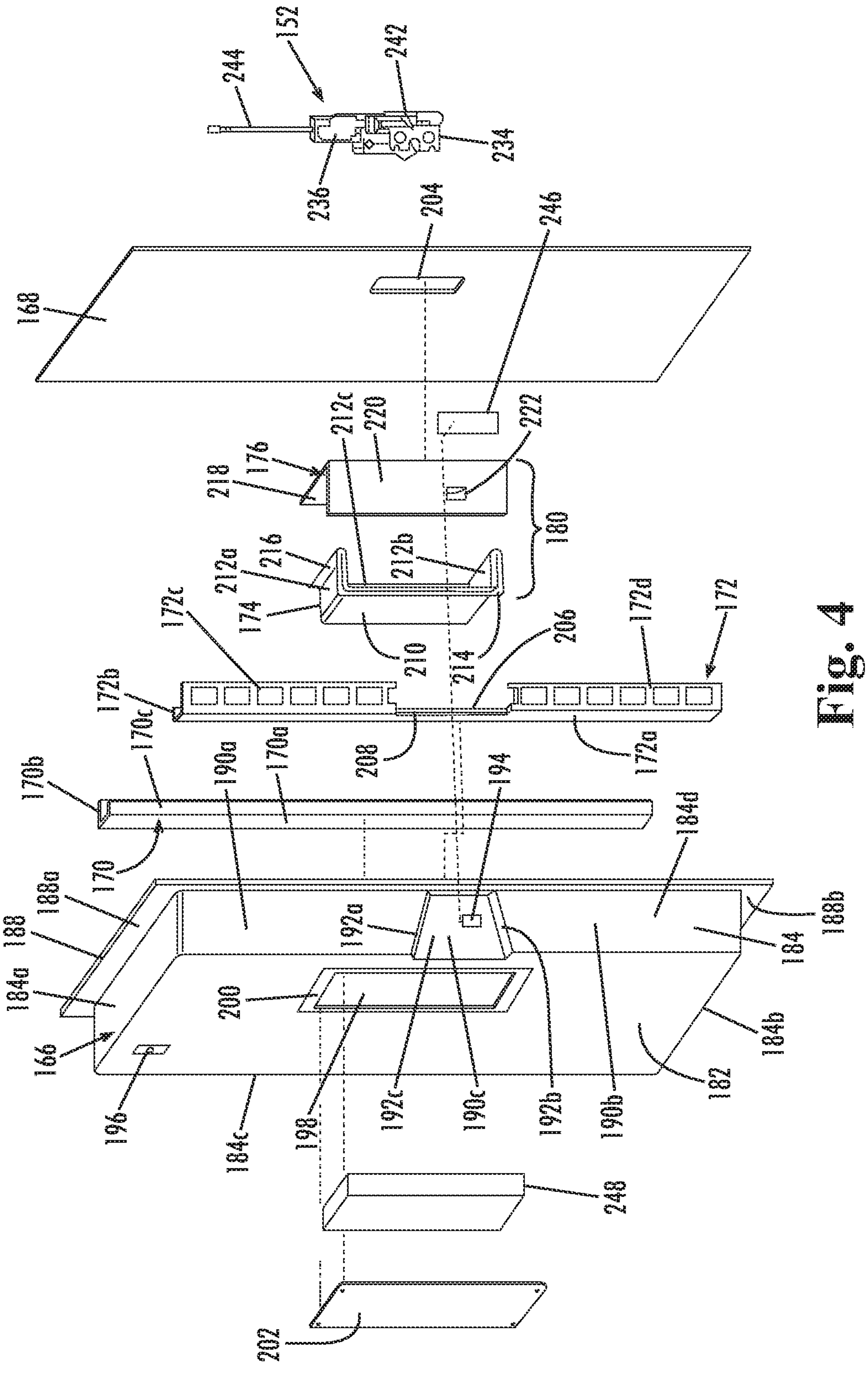
FIG. 4 is an exploded perspective view of the components that form the doors of the refrigerated trailer.
Figure 5:
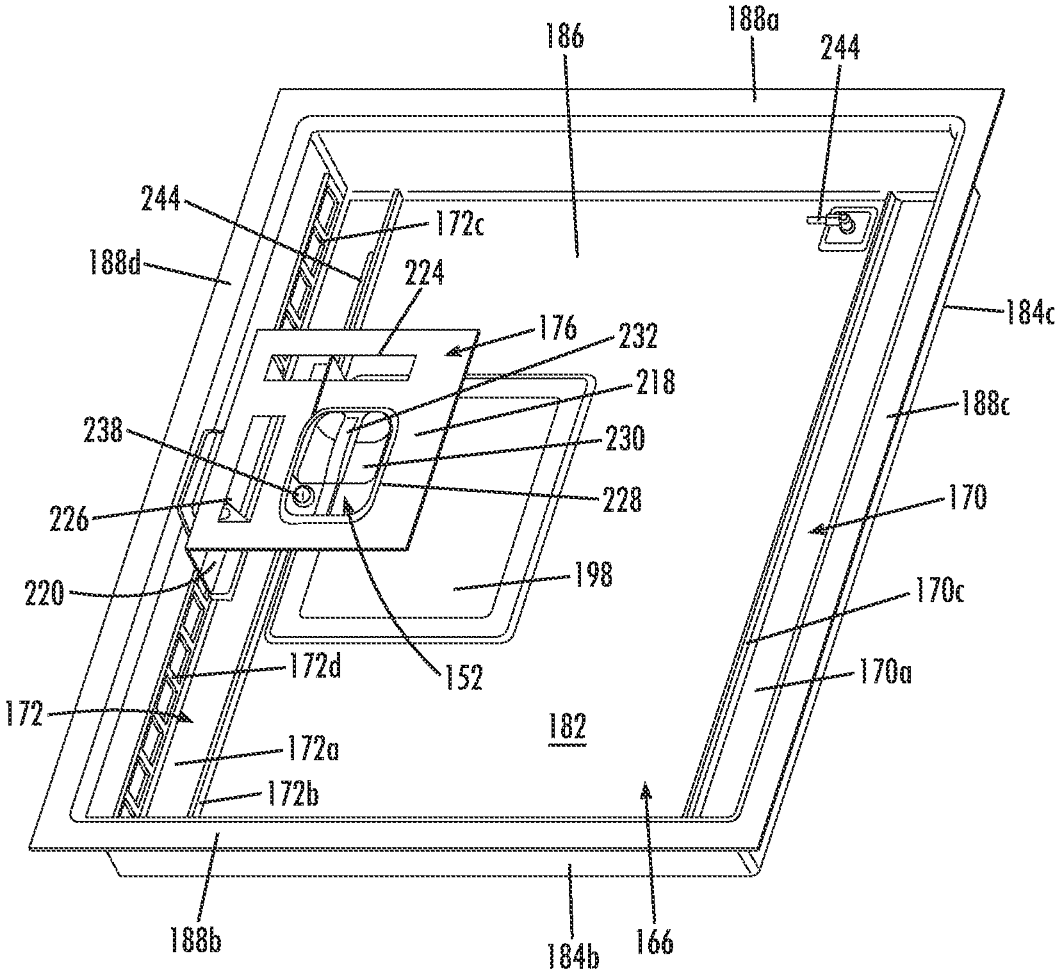
FIG. 5 is a perspective view of portions of the door of FIG. 3.
Figure 6:
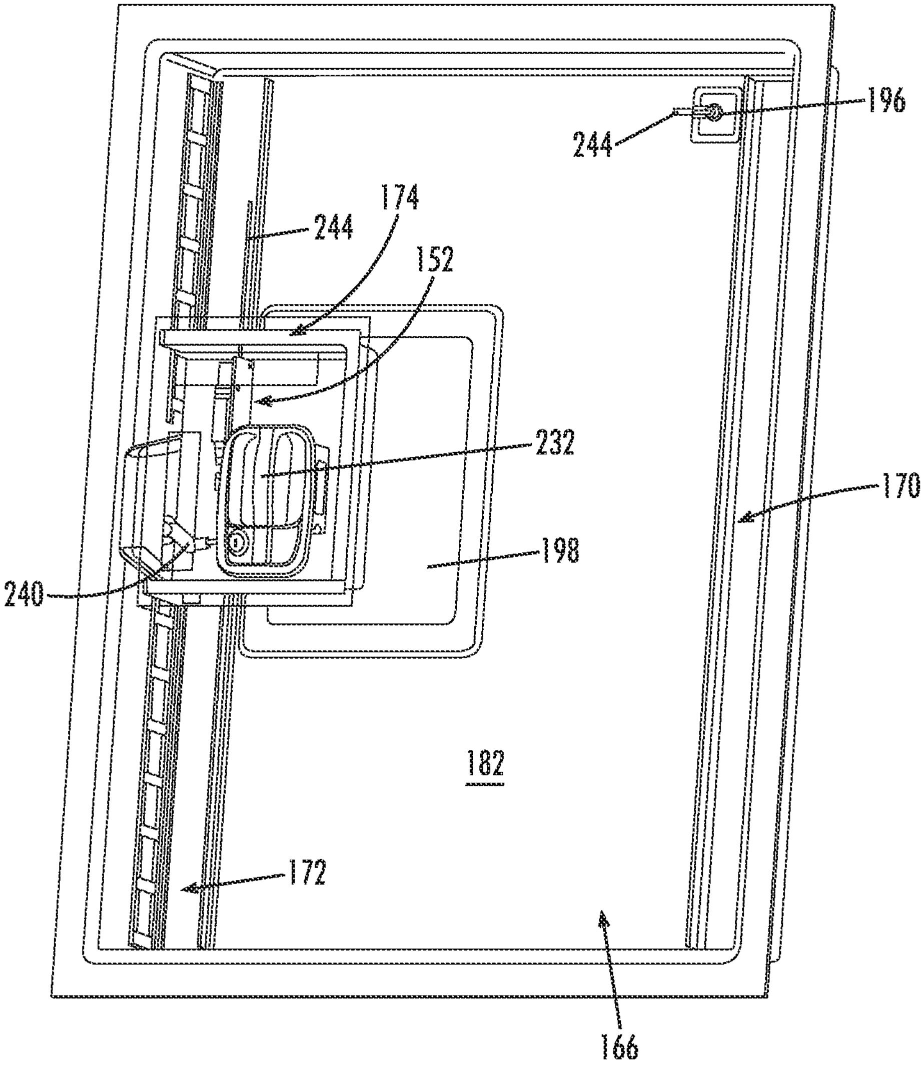
FIG. 6 is an alternate perspective view of portions of the door of FIG. 3.

Each door 34 is formed of a foamed plastic core 146 provided in a space between a door pan 166 and a door sheet 168. The door 34, along with the equipment used to foam each door 34, preferably contain foam with a foam expansion pressure of 8 PSI. The door pan 166 and the door sheet 168 are formed from fiberglass reinforced plastic (FRP). Referring additionally to FIGS. 4-6, an automotive-style handle and locking mechanism 152 is mounted to a housing 180 which is provided in the space. An example of such an automotive-style handle and locking mechanism 152 is shown in U.S. Pat. No. 7,111,880 which disclosure is herein incorporated by reference in its entirety.

Each door 34 includes the door pan 166, the door sheet 168, right and left backing channels 170, 172, an inner backing plate 174, an outer backing plate 176, the automotive-style handle and locking mechanism 152 mounted to the housing 180 and the foamed plastic core 146. The inner backing plate 174 and the outer backing plate 176 are assembled together to form a latch housing 180. The backing channels 170, 172 and the latch housing 180 are mounted between the door pan 166 and the door sheet 168. The automotive-style handle and locking mechanism 152 is mounted to the latch housing 180.

The door pan 166 is formed of FRP and includes a rectangular planar base wall 182 and a skirt 184 depending therefrom. The skirt 184 includes a top wall 184*a* which extends perpendicularly from an upper edge of the base wall 182, a bottom wall 184*b* which extends perpendicularly from a lower edge of the base wall 182, a right side wall 184*c* which extends perpendicularly from the right side edge of the base wall 182, and a left side wall 184*d* which extends at an angle relative to the left side edge of the base wall 182. The base wall 182 and the skirt 184 form a recess 186 into which the backing channels 170, 172 and the latch housing 180 are mounted. A lip 188 extends outwardly and generally perpendicularly from the skirt 184. The lip 188 includes an upper flange 188*a* which extends outwardly and generally perpendicularly from the end of the top wall 184*a*, a lower flange 188*b* which extends outwardly and generally perpendicularly from the end of the bottom wall 184*b*, a right side flange 188*c* which extends outwardly and generally perpendicularly from the end of the left side wall 184*c*, and a right side flange 188*d* which extends outwardly and generally perpendicularly from the end of the right side wall 184*c*.

The left side wall 184*d* has an upper section 190*a* which extends from the top wall 184*a* downwardly, a lower section 190*b* which extends from the bottom wall 184*b* upwardly and is planar with the upper section 190*a*, and a recessed section 190*c* provided between the upper and lower sections 190*a*, 190*b* and extends into the recess 186. The recessed section 190*c* includes an upper wall 192*a* which extends generally perpendicular to the upper section 190*a* and inwardly toward the recess 186, a lower wall 192*b* which extend generally perpendicular to the lower section 190*b* and inwardly toward the recess 186, and an intermediate wall 192*c* extending between the inner ends of the upper and lower walls 192*a*, 192*b* and which is parallel to, but offset from, the upper and lower sections 190*a*, 190*b*. A strike hole 194 is provided through the intermediate wall 190*c*.

A wire access hole 196 is provided through the base wall 182 proximate to the top edge thereof. An elongated access aperture 198 is provided through the base wall 182 proximate to, but spaced from, the recessed section 190*c*. A shallow depression 200 surrounds the access aperture 198 and extends into the recess 186. An access panel 202, formed of FRP, seats within the depression 200 and is secured by suitable means, such as adhesive, over the elongated access aperture 198. As a result, a flush inner surface of the door 34 is provided.

The door sheet 168 is a rectangular planar sheet of FRP material. The door sheet 168 has an access aperture 204 therethrough which is proximate to one of the sides of the door sheet 168. The door sheet 168 is shaped to correspond to the outer perimeter shape of the lip 188 of the door pan 166 such that when the door sheet 168 is seated on the lip 188, an interior space is provided. Hinges 36 are mounted on the door sheet 168 on the side opposite to the access aperture 204 for attaching the door 34 to the body 22.

The right backing channel 170 is generally U-shaped and has a height which is approximately the same as the height of the base wall 182 of the door pan 166. The backing channel 170 includes a generally rectangular base wall 170*a* having a right leg 170*b* extending perpendicularly from the right edge thereof and along the entire height of the base wall 170*a*, and a left leg 170*c* extending perpendicularly from the left edge thereof and along the entire height of the base wall 170*a*. The left leg 170*c* has a width (the distance the leg extends from the base wall 170*a*) which is less than the left leg 170*b*. The base wall 170*a* of the backing channel 170 seats against the base wall 182 of the door pan 166 and the right leg 170*b* seats against the right side wall 184*c* of the door pan 166. The backing channel 170 does not cover the wire access hole 196.

The left backing channel 172 is generally U-shaped and has a height which is approximately the same as the height of the base wall 182 of the door pan 166. The backing channel 172 includes a generally rectangular base wall 172*a* having a right leg 172*b* extending perpendicularly from the right edge thereof and along the entire height of the base wall 172*a*, an upper left leg 172*c* extending perpendicularly from the upper portion of the left edge of the base wall 172*a*, and a lower left leg 172*d* extending perpendicularly from the lower portion of the left edge of the base wall 172*a*. The upper left leg 172*c* and the lower left leg 172*d* are planar and have the same width (the distance the legs extends from the base wall 170*a*). The right leg 172 has a width which is less than the legs 172*c*, 172*d*. Each left leg 172*c*, 172*d* has a plurality of spaced-apart apertures provided therethrough. A space 206 is provided between the lower end of the upper left leg 172*c* and the upper end of the lower left leg 172*d*. A cutout 208 is provided in the base wall 172*a* and joins with the space 206. The base wall 172*a* seats against the base wall 182 of the door pan 166 and the left legs 172*c*, 172*d* of the backing channel 172 are positioned proximate to the left side wall 184*d* of the door pan 166. Since the left side wall 184*d* of the skirt 184 is angled, a space is provided between the left legs 172*c*, 172*d* and the left side wall 184*d*. The space/cutout 206/208 align with the recessed section 190*c* of the left side wall 184*d*.

The inner backing plate 174 is formed of FRP and includes a rectangular base wall 210, a top wall 212*a* which extends perpendicularly from an upper edge of the base wall 210, a bottom wall 212*b* which extends perpendicularly from a lower edge of the base wall 210, and a side wall 212*c* which extends perpendicularly from a side edge of the base wall 210. A wiring aperture (not shown) is provided through the inner backing plate 174. A three-sided flange 214 extends perpendicularly outwardly from the top, base and bottom walls 212*a*, 210, 212*b*. A three-sided flange 216 extends perpendicularly outwardly from the top, side and bottom walls 212*a*, 212*b*, 212*c*. The outer backing plate 176 is formed of FRP and has a base wall 218 and a side wall 220 which is perpendicular to the base wall 218. An access hole 222 is provided through the side wall 220 and aligns with the strike hole 194. As best shown in FIG. 5 (in which the inner backing plate 174 is not shown), a plurality of spaced apart apertures 224, 226, 228 are provided through the base wall 218. The base wall 218 of the outer backing plate 176 seats against the three-sided flange 216 of the inner backing plate 174, and the side wall 220 of the outer backing plate 176 seats against the three-sided flange 214 of the inner backing plate 174 to form an enclosure in which at least a portion of the automotive-style handle and locking mechanism 152 is seated. The inner backing plate 174 and the outer backing plate 176 are suitably secured together, for example by adhesive, to form the latch housing 180.

The base wall 210 of the inner backing plate 174 is proximate to the access opening 198 in the door pan 166. The side wall 220 of the outer backing plate 176 seats against the legs 172*c*, 172*d* of the backing channel 172.

The automotive-style handle and locking mechanism 152 is a standard automotive handle and lock constructed for opening and closing an automobile side door which is known in the art. The automotive-style handle and locking mechanism 152 is mounted to the outer backing 176 and is accessed through access aperture 204 in the door sheet 168.

The automotive-style handle and locking mechanism 152 includes a handle base 230 seated in aperture 228 and a handle 232 swing ably connected to the handle base 230. The handle 232 has a horizontally long shape and one end thereof is swingably connected to the handle base 230. The handle 232 is mounted to the door sheet 168 such that its axis of rotation is perpendicular to the height of the door 34. The handle 232 is swingable between its initial position in which an outer surface of the handle 232 lies substantially flush with the door sheet 168, and its opening position reached when the handle 232 is pulled away from the door sheet 168.

The automotive-style handle and locking mechanism 152 also includes known mechanical and electronic assemblies 234 for interconnecting the handle 232 and the locking assembly on the trailer when the door 34 is in the closed and locked position. The mechanical and electronic assemblies 234 preferably includes a receiver 236 for receiving signals for unlocking/locking the automotive-style handle and locking mechanism 152 as is known in the art, a key hole 238 into which a key is inserted for manually locking/unlocking the door 34, and a linkage 240 (see FIG. 6 which shows the outer backing plate 176 as transparent so the inner components can be seen) which extends through the access hole 222 in the outer backing plate 176. The receiver 236 may be wired to locks in the tractor/cab to receive signals therefrom (which may be generated by a key fob). The linkage 240 is connected to a rotary strike 242 that is seated within the recessed portion 190*c*. This rotary strike 242 interacts with a corresponding lock (not shown) on the body 22 to maintain the door 34 in the closed and locked position as is known in the art. The handle 132 can be easily grasped by a user and pulled to open the door 34 in the same way that a car door handle is activated.

A wire 244 (shown broken in FIGS. 4 and 5) is inserted through a receptacle in the wire access hole 196 and is in electrical connection with the automotive-style handle and locking mechanism 152. The wire 244 provides electrical signals from the tractor/cab to the automotive-style handle and locking mechanism 152 and supplies power from the power supply in the tractor/cab or on the trailer to the automotive-style handle and locking mechanism 152.

Now that the specifics of the door 34 have been described, the method of forming the door 34 is described.

The access aperture 198 is cut into the base wall 182 of the door pan 166. The backing channels 170, 172 are mounted in the recess 186 of the door pan 166 and are secured thereto by suitable means, such as adhesive.

The door pan 166 is attached to the door sheet 168 by suitable means, for example by adhesive, and clamped in a press. Thereafter, the door sheet 168 is trimmed to conform to the shape of the lip 188 on the door pan 166.

The outer backing plate 176 is attached to the inner backing plate 174 by suitable means, for example by adhesive, and the latch housing 180 is formed. The wiring aperture is drilled into the inner backing plate 174.

Next, the access aperture 204 is cut into the door sheet 168. The latch housing 180 is inserted through the access aperture 198 in the door pan 166 and using the access aperture 204 in the door sheet 168, the latch housing 180 is properly positioned within the recess 186 using an alignment plug (not shown). When properly positioned, the apertures 224, 226, 228 in the outer backing plate 176 align with the access aperture 204 in the door sheet 168. The outer backing plate 176 is secured to the door sheet 168 by suitable means, for example by adhesive.

The wire access hole 196 is drilled in the base wall 182 of the door pan 166 and the wiring receptacle is inserted therethrough. The wire 244 is run into the inner backing plate 174 through the wiring aperture. Thereafter, the wiring aperture in the inner backing plate 174 is sealed by suitable means by a user through the access aperture 204. As a result, the enclosure formed by the latch housing 180 is completely separated from the remainder of the interior space between the door pan 166 and the door sheet 168.

A foaming plug (not shown) is then installed in the access aperture 198 in the door pan 166. Foam is injected into the recess 186 through the foaming plug by suitable known means. The door 34, along with the door foaming equipment, preferably contains foam with a foam expansion pressure of 8 PSI. This provides sufficient structural rigidity to the resulting door 34. As a result, the latch housing 180 is substantially encapsulated by foam on three sides. The remaining side of the latch housing 180 abuts against the FRP door sheet 168.

Next, the strike hole 194 in the door pan 166 and the access hole 222 in the outer backing plate 176 are cut by suitable means and in this process, any foam in this pathway is removed.

The automotive-style handle and locking mechanism 152 is then inserted through the access aperture 204 in the door sheet 168 and is mounted to the inner backing plate 174 by suitable means, such as adhesive. The automotive-style handle and locking mechanism 152 is connected to wire 244. The linkage 240 is installed through the aligned holes 194, 222. A rotary strike gasket 246 is installed into the strike hole 194 and the rotary strike 242 is installed therein and connected to the linkage 240. The handle 232 and base 230 are mounted through the access aperture 204 in the door sheet 168. A cover plate 250 is secured to the outer surface of the door sheet 168 to cover the access aperture 204.

A foam plug 248 is inserted through the access opening 198 to encapsulate the remainder of the automotive-style handle and locking mechanism 152 on its inner side. The access panel 202 seats over the access opening 198 and is attached thereto by suitable means, such as adhesive. Thereafter, the hinges 36 are installed and the completed door 34 is attached to the body 22.

The door 34 can be unlock by pressing the "Unlock" button on the key fob or using the keyed lock 238 on the automotive-style handle and locking mechanism 152. The handle 232 is pulled to release the automotive-style handle and locking mechanism 152 and thereafter, is used to pull the door 34 open. The door 34 can be closed by pushing the door 34 closed to engage automotive-style handle and locking mechanism 152. The door 34 is locked by pressing the "Lock" button on the key fob or using the keyed lock 238 on the automotive-style handle and locking mechanism 152.

The doors 34 formed by the present invention can be up to four, five or six inches thick. This results in a thicker door 34 than prior art trailer doors, which can result in increased insulating properties.

The doors 34 are easy to operate and include the aesthetically appealing automotive-style handle and locking mechanism 152. The doors 34 provide ergonomics which potentially result in reduced fatigue and improved efficiencies of delivery route personnel. The automotive-style handle and locking mechanism 152 is lightweight and has a low profile to improve fuel mileage. The automotive-style handle and locking mechanism 152 can be electronically controlled through a key fob. The ease and convenience of the electronic lock decreases the chance of product theft.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

The invention claimed is:

1. A door for a refrigerated trailer comprising:

a door pan formed of fiberglass reinforced plastic, the door pan having an inner surface and an outer surface;

a door sheet formed of fiberglass reinforced plastic, the door sheet having an inner surface and an outer surface;

a foamed plastic core provided between the inner surfaces of the door pan and the door sheet;

a housing mounted between the inner surfaces of the door pan and the door sheet and substantially encapsulated within the foamed plastic core; and an automotive-style handle and locking mechanism mounted to the housing.

2. The door for a refrigerated trailer as defined in claim 1, wherein the housing is formed of fiberglass reinforced plastic.

3. The door for a refrigerated trailer as defined in claim 1, wherein the locking mechanism includes a receiver for receiving signals for unlocking and/or locking the automotive-style handle and locking mechanism.

4. The door for a refrigerated trailer as defined in claim 3, wherein the locking mechanism includes a key hole into which a key is inserted for manually locking and/or unlocking the door.

5. The door for a refrigerated trailer as defined in claim 1, wherein the locking mechanism includes a key hole into which a key is inserted for manually locking and/or unlocking the door.

6. The door for a refrigerated trailer as defined in claim 1, wherein the locking mechanism includes a handle having an outer surface which is substantially flush with the outer surface of the door sheet.

* * * * *